United States Patent [19]

Stevenson et al.

[11] 3,918,913

[45] Nov. 11, 1975

[54] SAMPLER-INJECTOR FOR LIQUID CHROMATOGRAPHY

[75] Inventors: Charles E. Stevenson; Henry F. Coffey, both of Indianapolis, Ind.

[73] Assignee: Eli Lilly and Company, Indianapolis, Ind.

[22] Filed: Dec. 2, 1974

[21] Appl. No.: 528,607

[52] U.S. Cl............... 23/259; 23/253 R; 73/425.6; 141/130
[51] Int. Cl.² .......................................... G01N 1/14
[58] Field of Search.................. 23/259, 253 R, 230; 141/130; 73/425.6, 61.1 C

[56] References Cited
UNITED STATES PATENTS

| | | | |
|---|---|---|---|
| 3,547,781 | 12/1970 | Guigan et al. | 23/259 |
| 3,607,097 | 9/1971 | Auphan et al. | 23/259 |
| 3,841,835 | 10/1974 | Kishimoto et al. | 23/253 R |

*Primary Examiner*—R. E. Serwin
*Attorney, Agent, or Firm*—Ralph W. Ernsberger; Everet F. Smith

[57] ABSTRACT

An automatic sampler-injector for use in liquid chromatographic analytical procedures is described which comprises in combination, A: (1) a cylinder closed on one end, and (2) a stopper for said cylinder, said stopper having an outside diameter slightly greater than the inside diameter of said cylinder and adapted for insertion in the open end thereof; and B: (1) a means for positioning said cylinder with said stopper in place therein beneath the point of a hollow needle, (2) an annular collar disposed around said needle at a sufficient distance from the point thereof to permit said point to penetrate said stopper, said collar having an outside diameter less than the inside diameter of said cylinder, (3) means for reciprocally moving said needle down and up in a vertical plane, (4) a conduit leading from said needle to a multiple inlet port valving means having a core with passageways communicating with said ports, (5) a closed sampling loop connected to two ports of said valving means, (6) means adapted to automatically position said valving means so that said sampling loop can first receive a sample for injection into a liquid chromatographic column and second to discharge such a sample into said chromatograph, and (7) means to effect the discharge of the contents of said sampling loop into said liquid chromatographic column.

20 Claims, 10 Drawing Figures

SAMPLER-INJECTOR FOR LIQUID CHROMATOGRAPHY

BACKGROUND OF THE INVENTION

1. Field of Invention

This invention relates to an apparatus for use in combination with a liquid chromatographic column. More particularly, this invention is concerned with an apparatus which automatically measures and injects a sample of liquid to be analyzed for its chemical content into a liquid chromatographic column.

2. Prior Art

Liquid chromatography is a process for separating the components of liquids to be analyzed for their chemical content. Generally, a small sample solution is injected into the flow steam of a chromatographic column containing one or more packings. The pressure on the column may range from atmospheric to 10,000 psig, or higher. In the column the various components of the sample are monentarily retained on the packing at various points along the column. In this way, essentially pure fractions of each of the components of the sample are separated and isolated. The use of high pressure promotes the precision of the adsorbtion and results in a more rapid separation of the components are from another.

After the components have been separated they are eluted from the packing and conveyed to a spectrophotometer, or other identifying device for the determination of the contents of each fraction separated from the sample in the liquid chromatographic column.

One of the problems associated with the use of liquid chromatographic columns involves the manner in which the sample is injected into the column.

One popular means for injecting the sample is to fill a syringe, to which a micro needle is attached, with the desired volume of liquid, pierce a septum, usually silicone rubber, with the needle and manually inject the sample into the column. This method requires the constant attendance of a technician to make the injection at the proper time.

Another popular means for injecting the same is through the use of a valve injector. A valve injector does not have the versatility of the infinitely variable volumes possible with a manually operated syringe, but other benefits ensue The valve injector usually is set to make repetitive injections of similar volumes. By such means as utilizing sampling loops of varying capacities in conjunction with the valve injector, different volumes can be realized by simply changing sampling loops. This, of course, is not very practical when only a limited number of samples are to be injected at each volume. But where large numbers of repetitive samples of similar volumes are to be injected the valve injectors to which is connected a sampling loop of an appropriate capacity is an eminently satisfactory means for precisely measuring and injecting consistent volumes of solution into liquid chromatographic columns.

The use of the valve injectors requires a means for transferring the solution into the sampling loop of the valve. Many different means are commercially available to accomplish this requirement. One of these means, and which is believed to be the only one bearing some similarity the the useful apparatus of this invention, is an embodiment of the Autosampler System of the Hamilton Company, 4960 Energy Way, Reno, Nevada, 89502 and which is used for injecting sub-microliter samples into a gas chromatograph.

The Hamilton apparatus employs a cylinder, closed on one end, into which is placed a quantity of the solution to be injected into the gas chromatograph. A vented piston is inserted into the cylinder and the assembly is positioned in a turntable which accepts a number of similarly prepared samples. The turntable is equipped with a septum seal for each sample assembly and each sample assembly is closed with such a seal.

The turntable is rotated beneath a vertically reciprocating needle adapted to pierce the septum seal, enter the vent in the piston and on the down stroke push the piston downwardly into the cylinder forcing the liquid into the needle and through a metering means integrally constructed within the needle to measure a precise amount of sample which is then conveyed by a carrier gas to the gas chromatograph.

Such an assembly requires both an independent septum and a piston; first, to seal the sample liquid in the cylinder against evaporation and, second, to remove the liquid from the cylinder. Moreover, the opening in the piston adapted to receive the downwardly stroking needle allows evaporation from the cylinder from the time the liquid to be sampled is placed therein until the septum seal is positioned after the filled cylinder is disposed in the turntable.

Furthermore, the needle assembly is a complex mechanism which combines the metering function with the sampling function and must be adapted to still another function that is independent of the metering function; namely, the function of delivering the measured sample from the needle to the gas chromatograph.

The Hamilton device does not require a valve injector as it is designed to feed the sample to a gas chromatograph, an instrument which is operated at a relatively low pressure. And, even though it is believed that the sampling function embodied in the novel apparatus of this invention is patentably distinct from the Hamilton apparatus, the latter is detailed herein inasmuch as it is believed to be closest prior art.

Accordingly, it is an object of this invention to provide an apparatus adapted to be operated in combination with a cylinder for holding the liquid to be sampled which is closed with a stopper which acts as both a piston and seal, said apparatus accomplishing the removal of the liquid from said cylinder, metering a controlled volume of liquid and delivering such volume to a liquid chromatographic column.

Another object of this invention is to provide the combination of a cylinder for holding the liquid from which a sample is to be removed and injected into a liquid chromatographic column, a stopper for said cylinder adapted to seal said liquid in said cylinder against evaporation and to perform the function of a piston in removing said liquid from said cylinder, and an apparatus for effecting the removal of said liquid from said cylinder, measuring a precise quantity of said liquid as a sample, and injecting said sample into a liquid chromatographic column.

Still another object of this invention is to provide for the automated sampling and injecting of a plurality of samples of consistent repetitive volumes of liquids into a liquid chromatographic column, or columns.

SUMMARY

Now is has been discovered that an automatic samplerinjector for use with a liquid chromatographic column which is comprised of the combination of: A, a cylinder closed on one end and a stopper adapted to slide into the open end thereof after liquid to be sampled is placed therein; and, B, means for positioning said cylinder with said stopper in place therein beneath the point of a hollow needle having an annular collar surrounding the vertical shaft thereof, means for contacting said stopper with the point of said needle, piercing said stopper and moving said stopper toward the bottom of said cylinder and subsequently returning said cylinder and said needle to their starting positions, a conduit connecting said needle with one port of a multiple port valving means, a sampling loop connected to two ports of said valving means, means that will first dispose the ports and passageways in said valving means in a configuration wherein said sampling loop can receive a sample of the liquid contained in said cylinder and, second, in a configuration that will permit the flushing of the material in said sampling loop into a liquid chromatographic column, and means to effect such flushing constitutes a new and novel apparatus to automatically sample and inject repetitive accurately measured quantities of liquid into a liquid chromatograhic column for the separation of the components of such liquid.

DESCRIPTION OF THE PREFERRED EMBODIMENTS

Figure 1:
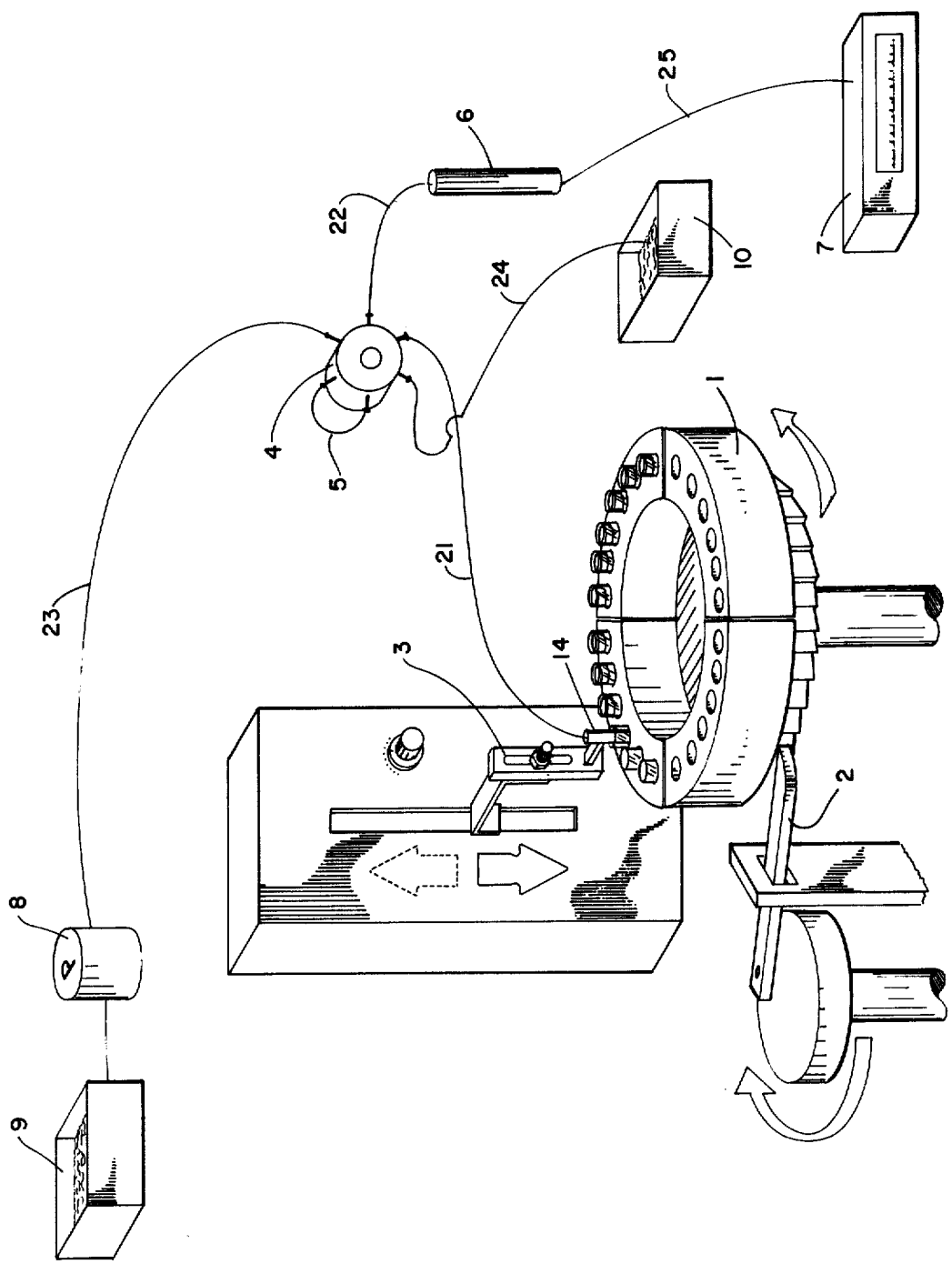
FIG. 1 shows a perspective view of the combination of elements which comprise the sampler-injector used with a liquid chromatographic column.

In the following detailed description of the enbodiments of this invention reference is made to the accompanying drawings.

In one aspect of this invention an automatc sampler-injector for use with a liquid chromatographic column is comprised of, in combination:

I. A sample container comprised of: (a) a cylinder 11 having a closed end, and (b) a stopper 12 adapted to slide snugly into the open end of said cylinder 11, after liquid to be sampled has been placed therein, said stopper being adapted to be pierced by a needle; and II. Means for removing a sampler from said sample container, measuring said sample, and injecting said sample into said liquid chromatographic column comprised of: (a) a hollow needle 13 spatially disposed above said sampler container, said needle 13 having an annular collar 14 affixed therearound at a sufficient distance from the point of said needle 13 to permit the point thereof to penetrate said stopper 12; (b) means for positioning said sample container beneath said needle so that said needle and said sample container are in the same vertical plane; (c) means for contacting said stopper in said sample container with said needle, piercing said stopper with said point of said needle, contacting said stopper with said collar and moving said stopper toward the closed end of said cylinder, said movement ending when the point of said needle nears the closed end of said cylinder, and then reversing said movement until said cylinder and said needle-collar assembly are returned to their starting positions; (d) a conduit 21 connecting said needle 13 with the first port of a six-port valving means 4; (e) a discharge conduit 24 connected to a second port of said valving means 4; (f) a sampling loop 5 connected to third and fourth ports of said valving means 4; (g) a means 8 and 9 for flushing a sample from saich sampling loop 5 into said liquid chromatographic column connected by conduit 23 to a fifth port of said valving means 4; (h) a conduit 22 to said chromatographic column connected to the sixth port of said valving means 4; (i) means for aligning the first and fourth, the second and third, and the fifth and sixth ports, respectively, of said valving means 4 as said needle 13 pierces said stopper 12 and said stopper 12 is moved to the bottom of said cylinder 11, and means for aligning the first and second, the third and sixth, and the fourth and fifth ports, respectively, of said valving means 4 as said needle 13 and said cylinder 11 are returned to their starting positions; (j) means for flushing said sample from said sampling loop 5 into said chromatographic column 6 through conduit 22; and (k) means 2 for advancing the next sample container to a position directly between said spatially disposed needle 13.

The novel combination of elements for the automatic sampling and injecting of a sample solution into a liquid chromatographic column which are embodied in this aspect of the instant invention are constructed and operated as illustrated and described hereinafter.

In FIG. 1 a turnable 1 is shown holding a number of sample containers from which samples of liquid can be removed. In this rendering the collar 14 is shown disposed in one of said sample containers and is illustrative of relationship between the sample container and the mechanisms utilized to remove the liquid therefrom. A turntable is one mechanism that can be utilized as a feeding-positioning device for delivering the sample containers to a predetermined location where a sample container and a needle 13 are disposed in the same vertical plane. Moreover, a means 2 can be employed to advance said turntable from one sample container to the next. Such means can be synchronized with means 3 which is adapted for contacting the stopper in the sample container with said needle 13 and subsequently piercing said stopper and bring said collar 14 into contact with said stopper and moving said stopper toward the closed end of the cylinder of the sample container.

Alternatively, a simple linear bar having vertical cavities disposed therein for accepting the sample containers can be adapted to serve as a feeding-positioning device for delivering the sample container to the predetermined location discussed above. Such a linear bar can be combined with a guide track and a mechanism to effect the advance of the sample containers one at a time to such location and can be synchronized with the return of the sample container and the needle 13 to their starting positions. Those skilled in the art will readily recognize the mechanics of such a feeding-positioning system, which in themselves constitute an element of the totality of the instant invention, but, standing alone, are not a part thereof.

As with the means shown in FIG. 1 for positioning the sample container for the removal of the liquid therefrom, the means shown in FIG. 1 for effecting the removal of the liquid from said sample container constitutes only one of the mechanisms available to accomplish such liquid removal through contacting the stopper of the sample container with the sharp point of a hollow needle, piercing said stopper, contacting said stopper with the collar surrounding said needle and moving said stopper toward the bottom of the cylinder of the sample container.

The preferred mechanism for accomplishing this step is illustrated in FIG. 1. There it is seen that a means is provided to reciprocatingly move a member 3 down and up in a vertical plane. Said member 3 is affixed to the collar 14 which is around needle 13. Such a mechanism is more completely detailed in FIG. 3. In operation the down and up movement of member 3, and consequently needle 13 and collar 14, is synchronized with the positioning of the sample container in the feeding-positioning device directly below said needle 13 in the same vertical plane and the alignment of the passageways and ports of valving means 4, discussed hereinafter.

Alternatively the needle 13-collar 14 assembly can be stationarily disposed spartially above the position in the same vertical plane to which the sample container is delivered by the feeding-positioning device. The same identical method of contacting the stopper with the point of needle 13, piercing said stopper, contacting said stopper with collar 14 and moving said stopper toward the bottom of the cylinder of said sample container can be accomplished by adapting a mechanism to move the sample container upwardly until the point of the stationarily disposed needle is near the bottom of the cylinder of the sample container and then reversing the direction of the movement of the sample container until the latter is returned to its starting position beneath said spatially disposed needle.

Such mechanisms, standing alone, constitute no part of this invention as they are all old in the art. However, such a mechanism is an essential element in the instant invention and in combination with the other elements described herein is necessary to accomplish the removal of the sample of liquid from the sample container through the contacting of the stopper in the sample container with a sharply pointed hollow needle, piercing said stopper and moving said stopper, acting as a piston to a location near the bottom of the cylinder of the sample container.

A conduit 21 conveys the liquid from the sample container to one port of a valving means 4. The valving means 4 is equipped with a sampling loop 5 into which the liquid from the sample container is delivered and the excess is conveyed through conduit 24 to a waste receptacle 10.

In operation the quantity of liquid which is transferred from the sample container is considerably larger than the capacity of sampling loop 5. This is done to provide a sufficient volume of liquid to completely flush all of the residual material from the previous sample out of the needle 13, the sampling loop 5, the transfer conduit 21 and the passageways within the valving means 4 into the waste receptacle 10 so that each charge that is introduced into the sampling loop 5 is not contaminated with material from the previous charge.

The valving means 4 can be either a rotary core valve, a reciprocating slidable core valve wherein the passageways within the core are designed to communicate with the appropriate ports of the valve to which the various conduits 21, 22, 23, and 24, and the sampling loop 5 are connected, or any other type of sampling valve.

Also shown in FIG. 1 is the means for flushing the sample introduced into the sampling loop 5 from said sampling loop 5 into a liquid chromatographic column 6. This means is comprised of a reservoir 9 of the solvent which is the vehicle for the components to be separated in said chromatographic column 6. Such solvent is transferred by pump 8 through conduit 23 into one of the ports of the valving means 4, and by properly aligning the passageways in the core of said valving means 4 the solvent being pumped through conduit 23 flushes the sample from said sampling loop 5.

Also shown in FIG. 1, in a schematic rendering, is a spectrophotometer 7 which is connected to liquid chromatographic column 6 by conduit 25. Neither the chromatographic column 6, the conduit 25, nor the spectrophotometer 7 constitutes a part of this invention.

Figure 2:
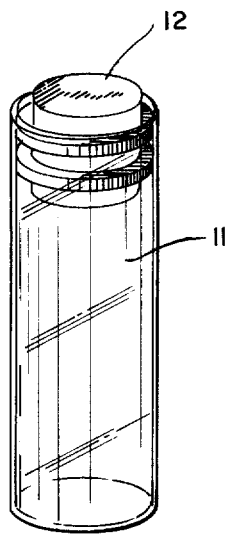
FIG. 2 is a perspective view of the sampler container element used for holding the liquid from which a sample is measured for injection into a liquid chromatographic column.
Figure 2A:
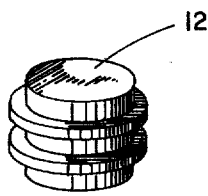
FIG. 2A is a perspective view of a stopper used as an integral part of the sample container.
Figure 2B:
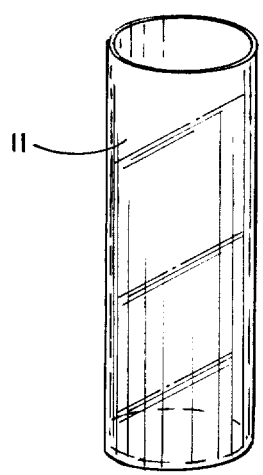
FIG. 2B is a perspective view of a cylinder closed on one end and opened on the other used as an integral part of the sample container.

In FIG. 2 is shown the two parts which comprise the sample container. These are a cylinder 11 open on one end and closed on the other. Into the open end of this cylinder 11 is inserted stoppper 12. The stopper 12 is shown in FIG. 2A in a perspective rendering and the cylinder 11 is shown perspectively in FIG. 2B. The size of the cylinder with respect to both its height and diameter is not critical in this invention. Neither is the material of construction. It is convenient, however, to use a common glass or plastic vial which has straight sides and a flat closed end. One of the vials which is useful in this invention is known as a perfume vial. Other vials of a similar configuration will be well-known to those skilled in the art.

The configuration of the stopper 12 is critical to this invention inasmuch as this stopper operates not only to seal the cylinder 11 after the liquid to be sampled is placed therein, but also as a piston to force the liquid in said cylinder 11 out through a hollow needle which pierces said stopper 12 and serves as the conduit away from the cylinder 11 as said stopper 12 is pushed by the annular collar 14 surrounding the hollow needle 13 from the open end towards the closed end of said cylinder 11. In the illustration of FIG. 2A said stopper 12 is shown with two annular rings. This is the preferred configuration, but such is not essential. A single annular ring would suffice to provide a seal between the interior walls of said cylinder 11 and said stopper 12, and if it were desired, more than two annular rings could be provided on said stopper 12. However, such is not required and actually would be a handicap because the greater the number of annular rings, the greater the friction between the walls of cylinder 11 and the stopper 12 requiring a greater force to move the stopper 12 slidably within said cylinder 11 as liquid is being forced therefrom. As the illustration in FIG. 2A shows, the two annular rings are balanced by being placed about equidistant from each other and the top and the bottom of the stopper, respectively. This is only a convenient placement and the spirit of this invention does not limit such placement to this design.

It is imperative that the outside diameter of the annular rings on stopper 12 shall be slightly greater than the inside of cylinder 11 into which said stopper 12 is to be inserted. It will be clear, however, that this diameter should not be so much greater than that required for an adequate seal that excessive force will be required for moving said stopper 12 within the inside of said cylinder 11.

Figure 3:
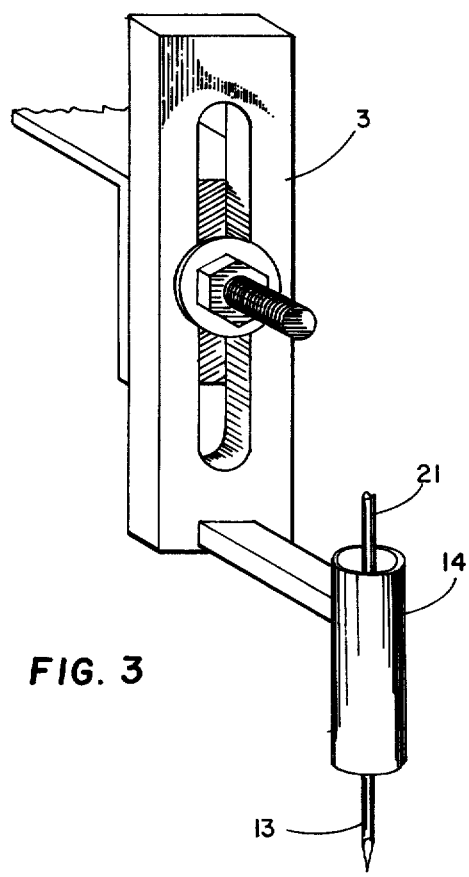
FIG. 3 is a perspective view of the sharply pointed hollow needle with an annular collar affixed thereto and attached to a means for moving said needle down and up in a vertical plane.

FIG. 3 shows the assembly of the hollow needle 13 which pierces the stopper 12 and serves as the conduit for the removal of the liquid from the sample container. The annular collar affixed around the circumference of said needle 13 is shown attached to the means 3 for moving said needle 13 downwardly to pierce said stopper 12. The annular collar 14 need not be as elongated as is shown in FIG. 3. It can be of any convenient height consistent with the operation of the needle 13 in a vertical plane. Moreover, the annular collar 14 is essential as a means for contacting the upper face of stopper 12 and forcing said stopper 12 downwardly within cylinder 11 so that forcing said stopper 12 downwardly within cylinder 11 so that said stopper 12 acts as a piston. For this reason, the outside diameter of said collar 14 should be about 50 to 90% of the inside diameter of such cylinder 11 — preferably, the outside diameter of said collar 14 should be about 75 to 80% of the inside diameter of said cylinder 11. This provides an adequate surface for the contact between said collar 14 and said stopper 12 and at the same time provides sufficient clearance between the outside of said collar 14 and the inside of said cylinder 11.

Figure 3A:
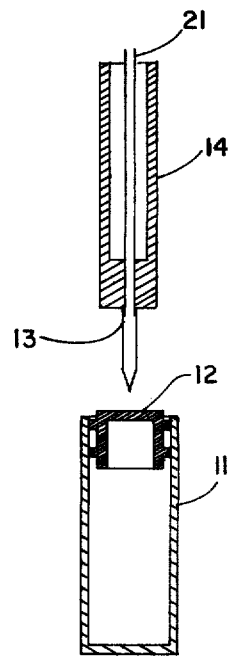
FIG. 3A shows a vertical cross-sectional view of the needle with affixed annular collar disposed spatially above the sample container of FIG. 2.

In FIG. 3A there is shown a vertical cross section of cylinder 11 with stopper 12 in place and needle 13 with collar 14 attached disposed spatially directly thereabove. The number 21 represents the conduit through which the liquid is conveyed from needle 13 to valving means 4, but is not completely shown here.

Figure 3B:
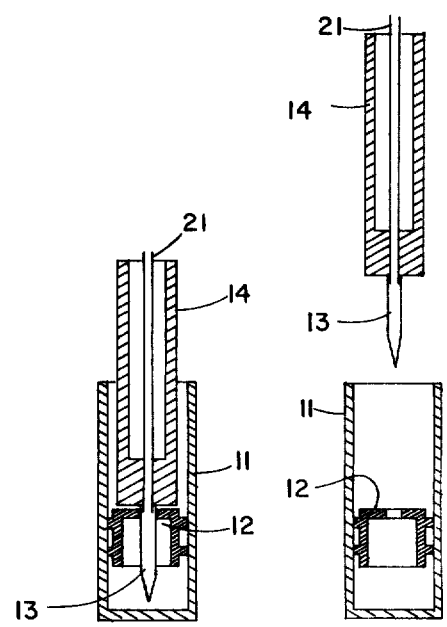
FIG. 3B shows a vertical cross-sectional view of the sample container of FIG. 2 and the needle-collar assembly after the latter has penetrated the stopper of the sample container and pushed said stopper to the bottom of the cylinder.

FIG. 3B shows the disposition of needle 13 at the furthest penetration of said needle 13 into said cylinder 11. By contacting said stopper 12 with the face of said annular collar 14 and moving the assembly downwardly said stopper 12 serves as a piston pushing the liquid contained in said cylinder 11 out through the hollow needle 13 and conduit 21 and on to said vavling means 4, not shown here.

Figure 3C:
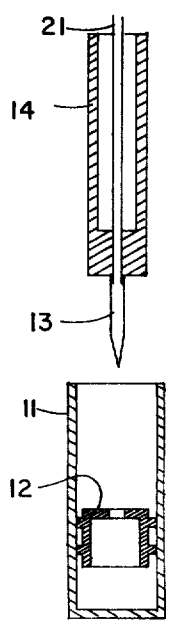
FIG. 3C shows a vertical cross-sectional view of the sample container of FIG. 2 and the needle-collar assembly after the latter has been returned to its starting position.

In FIG. 3C the needle 13 and annular collar 14 have been returned to the position from which the downward thrust was started. The needle 13 has been withdrawn from stopper 12 leaving said stopper 12 disposed near the bottom of said cylinder 11.

Sequentlly, FIG. 3A, 3B and 3C represent the positions of needle 13 as the cycle during which the liquid sample is removed from the sample container goes a full turn.

Figure 4:
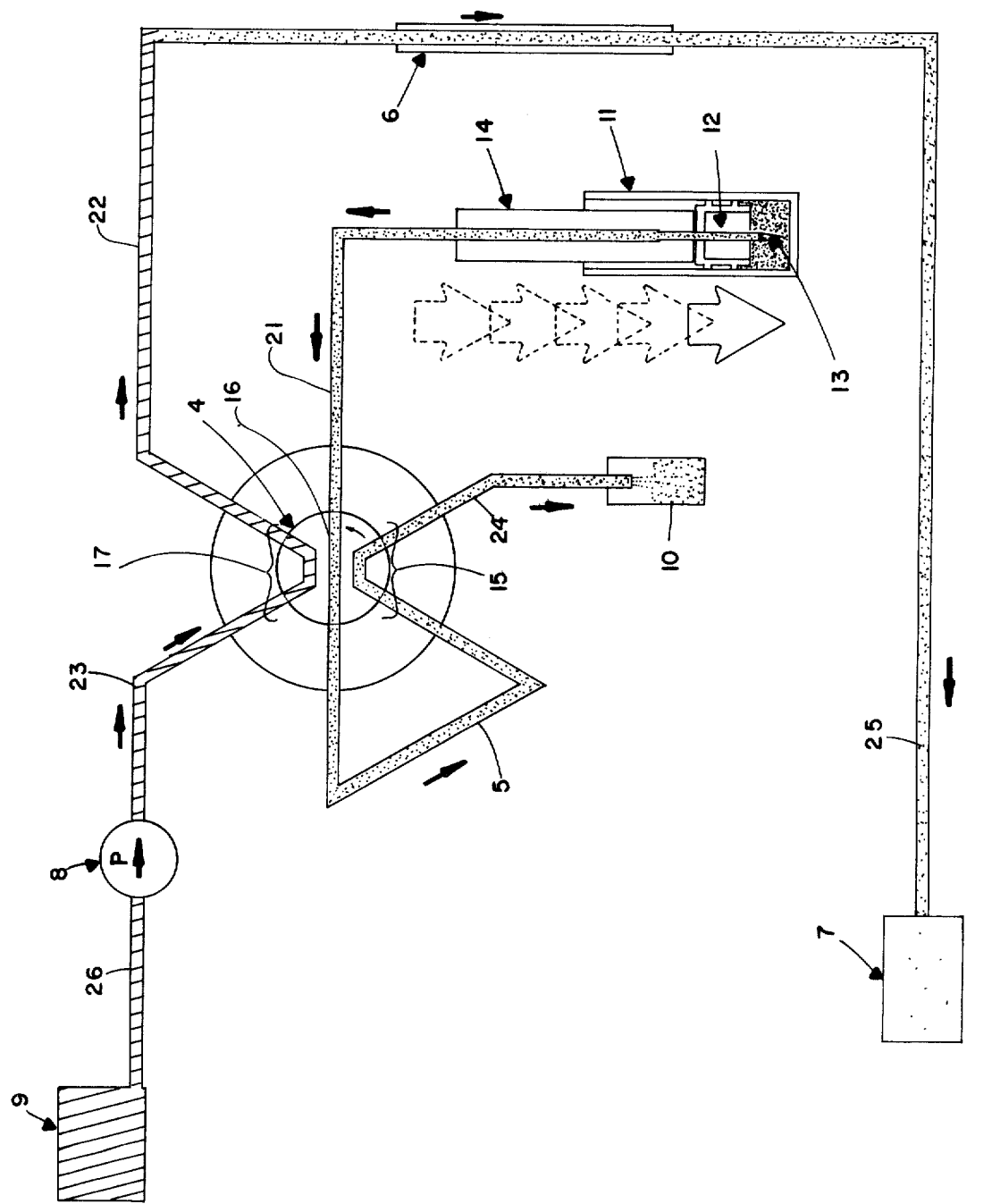
FIG. 4 shows schematically the alignment of passageways in the core of a rotary valve with the ports thereof as the sampling loop is being filled with sample on the downward stroke of the needle-collar assembly.

FIG. 4 is a schematic flow diagram of the alignment of the ports and passageways in a six-port rotary core valve which is the preferred valving means for use in the novel apparatus of ths invention. The cylinder 11 with residual liquid remaining therein is shown in a vertical cross-sectional rendering. Stopper 12 is shown near the bottom of said cylinder 11 and hollow needle 13 is at the end of the downward thrust. Annular collar 14, affixed to said needle 13, is shown in contact with said stopper 12 having forced said stopper 12 toward the bottom of said cylinder 11 displacing the liquid therein and forcing the latter into conduit 21, connected with a first port of valving means 4.

The alignment of the passageways in the core of said valving means 4 is shown with conduit 21 being in communication with a fourth port 180° from said port, and connected to said fourth port is one end of a closed sampling loop 5. The opposite end of said sampling loop 5 is connected to a third port of said valving means 4, and a passageway 15 in the core of said valving means is aligned so that said third port communicates with a second port permitting the liquid flowing into and out of said sampling loop to be discharged through conduit 24, connected to said second port, into a waste collector 10.

The substantial excess of liquid which is forced out of said cylinder 11 and through the circuit described above serves to flush out all of the sample remaining in the system from the previous sampling.

While passageway 16 is aligned to communicate between said first and fourth ports, and passageway 15 is aligned to communicate between said second and third ports, respectively, of valving means 4, passageway 17 communicates between the fifth and sixth ports of said valving means 4.

The means to flush the sample from said sampling loop 5 is connected to said firth port of the valving means 5. Such means is illustrated by the combinations of a reservoir 9 of the solvent used as the vehicle for the components being separated in the chromatographic column 6, a conduit 26 connected from the reservoir 9 to a pump 8, and conduit 23 connected from said pump to the fifth port of the valving means 4.

The sixth port of the valving means 4 is connected to the liquid chromatographic column 6 by conduit 22. With passageway 17 communicating with ports 5 and 6 of the valving means 4, a stream of solvent from reservoir 9 flows into the liquid chromatographic column as long as pump 8 is operated; and, in the operation of the useful sampler-injector of this invention it is preferred to operate pump 8 continuously while the sampler-injector is being utilized to feed liquid into the sampling loop 5.

From chromatographic column 6, the separated components present in the sample introduced into said column are conveyed by conduit 25 to a spectrophotometer. Neither the liquid chromatographic column 6, the conduit 25, nor the spectrophotometer 7 is a part of this invention.

Many means are readily available to align the valving means 4 so that the valve core passageways described hereinbefore communicate with the appropriate ports in the valving means 4 to permit the flow of the various liquids as discussed above to take place as the needle 13 is traveling downwardly in cylinder 11. One useful means is a rotary solenoid adapted to rotate 60° clockwise and then reversed 60° counterclockwise. Other means will be known to those skilled in the art.

The means for aligning the core of valving means 4 is synchronized with the means for moving needle 13 downwardly and upwardly so that the alignment of the valve ports and passageways are as shown in FIG. 4 at the start of the down stroke of needle 13. When needle 13 has reached the end of its down stroke, the actuation of the means for rotating the core of valving means 4 is synchronized with the means for returning needle 13 to its starting position and just before needle 13 starts its upward stroke, the means for rotating the core of valving means 4 rotates the latter 60° counterclockwise setting up the alignment of ports and passageways in valving means 4 as shown in FIG. 5.

Figure 5:
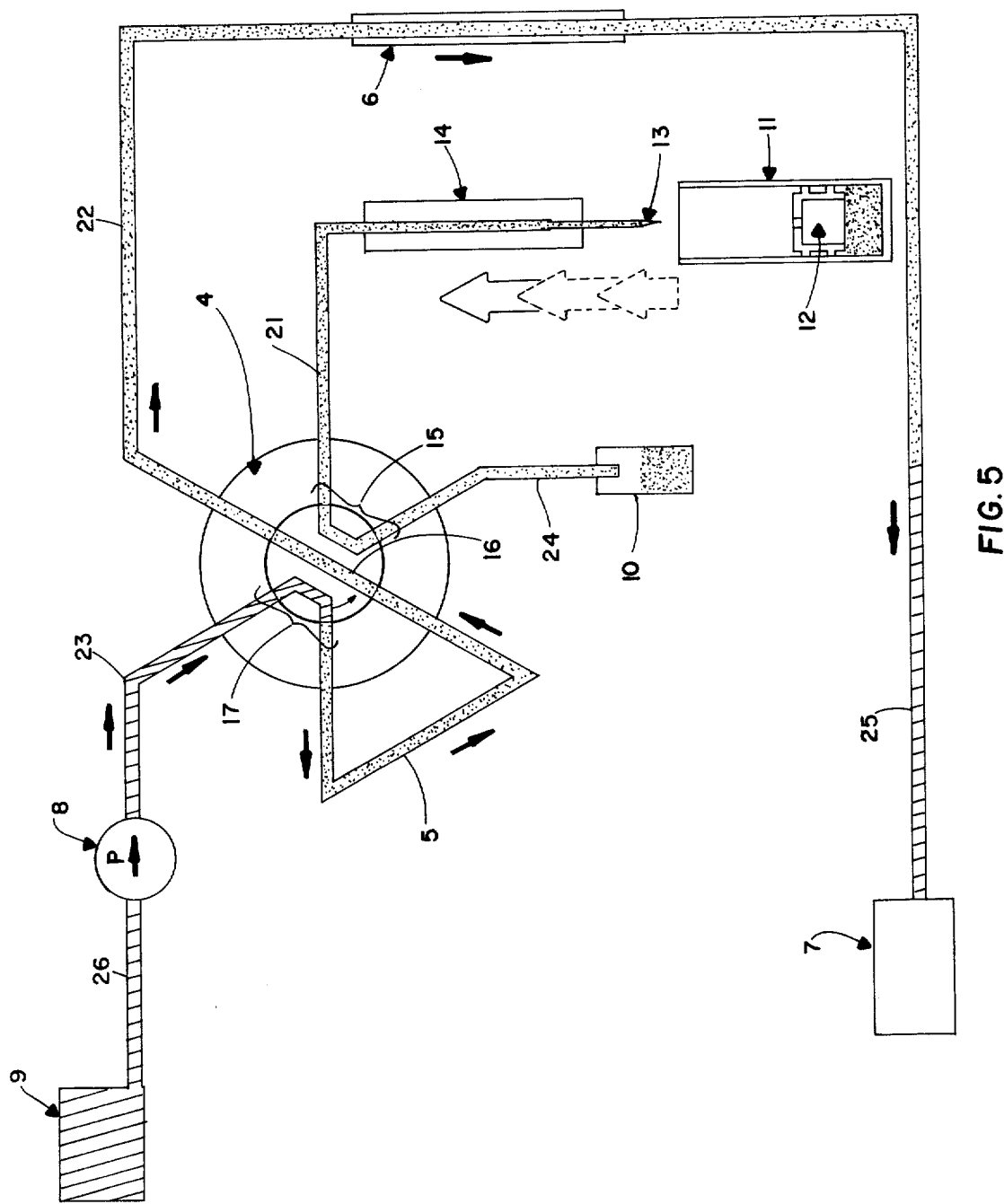
FIG. 5 shows schematically the alignment of passageways in the core of a rotary valve with the ports thereof as the sample measured in the sampling loop is being flushed into the liquid chromatographic column on the upward stroke of the needle-collar assembly.

FIG. 5 shows a schematic flow diagram of the alignment of the passageways in the core with the ports of valving means 4 after the flow of the sample in sampling loop 5 has been directed into the chromatographic column 6. Passageway 15 communicates with the first and second ports, and in essence discharges any excess liquid into waste receptacle 10. Passageway 16 communicates with the third and sixth ports of valving means 4 and permits the sample in sampling loop 5 to flow into conduit 22 and on to liquid chromatographic column 6. The means for flushing the sample from sampling loop 5 communicates with said sampling loop 5 through passageway 17. The continuous flow of solvent being conveyed through conduit 23 from pump 8 flushes the sample from sampling loop 5.

The needle 13-collar 14 assembly has returned to its starting position above the sample container.

During the interval in which the sample is being flushed from the sampling loop 5 into the chromatographic column 6, the means 2 for advancing turntable 1 to a position where the next sample container is disposed beneath the needle 13-collar 14 assembly is actuated and the next sampling is ready to be made as soon as such interval is terminated. The cycle is completed and the next cycle can be initiated.

While the illustrations discussed herein relate to a six-port rotary core valve with specific passageways provided in the core thereof, there are other configurations of rotary valve core passageways which are equally useful in practicing this invention. These will be known to those skilled in the art. For example, one such configuration would provide 3 independent passageways each of which would be designed to communicate with two adjacent ports, each 60° apart. By appropriate connections of the various elements to the ports in the valve, the same flow patterns can be realized as those discussed above, and all other elements of this invention remain the same.

Moreover, this invention is not limited to the use of a rotary core valve with a core having passageways that can be arranged to communicate with various ports by simply rotating the core. Valving means having a core which moves in and out slidably instead of rotating can be used with equal facility. It is necessary only to arrange the connection to the ports and the passageways in the slidable core to communicate with the appropriate ports at the period during the operations of the cycle to direct the flow of the various liquids through the indicated conduits. Other sampling valve desgins operative in this invention will be known to those skilled in the art.

Furthermore, the sampling loop 5 can be of any desired capacity needed to provide a sample of sufficient volume to the liquid chromatographic column 6 to separate the components into the individual fractions required for spectrophotometric determinations.

The inside diameters of the various conduits and the sample loop 5 are not critical; however, one convenient size was found to be 0.3 mm. Other sizes can be adapted to "plug" flow and are useful in assembling the elements of this invention.

In another aspect of the instant invention there is provided a novel method for automatically sampling and injecting consistently uniform volumes of solution into a liquid chromatographic column. This method is comprised of the following steps:

a. A quantity of the solution to be sampled and injected into a liquid chromatogrphic column is placed in a cylinder closed on one end and open on the other.

b. A snugly fitting stopper adapted to be pierced by a needle and to serve as a piston is inserted into the open end of the cylinder of (a).

c. The cylinder of (b) is placed in one of a plurality of vertical cavities in a feeding-positioning device equipped with means to advance such device one cavity at a time to a position directly beneath a spatially disposed needle.

d. A sharply pointed hollow needle is spatially disposed vertically above the center line of the cylinder of (c), said needle having an annular collar affixed around the circumference thereof at a sufficient distance from the point thereof to permit the point of said needle to penetrate said stopper, said needle-collar assembly being connected to a means for moving said assembly down and up reciprocally.

e. A conduit is connected between the needle and the first port of a six-port valving means.

f. A conduit is connected from the second port of said valving means to a waste receptacle.

g. A closed sampling loop having a volume equal to the volume of the sample desired to be injected into said liquid chromatographic column is connected to the third and fourth ports of said valving means.

h. A means for flushing the sample from said sampling loop is connected to the fifth port of said valving means.

i. A conduit is connected from the sixth port of said vavling means to said liquid chromatographic column.

j. The valving means is set so that passageways in the core thereof are aligned to communicate ports 1 and 4, 2 and 3, and 5 and 6, respectively.

k. The needle-collar assembly is moved downwardly contacting, piercing and pushing the stopper in the cylinder of (b) toward the closed end thereof forcing the liquid from said cylinder into and through said needle and into the first port of said valving means. The liquid entering the first port flows out the fourth port into the sampling loop and back into said valving means through the third port, out through the second port thereof and is discharged into a waste receptacle.

l. When all of the liquid to be removed from the cylinder of (b) has entered said needle, the valving means is reset so that passageways in the core thereof are aligned to communicate ports 1 and 2, 3 and 6, and 4 and 5, respectively.

m. The sample measured in the sampling loop is flushed into the chromatographic column by introducing a stream of the solvent which is employed as the vehicle for the components in the liquid placed in the cylinder of (b) into the fifth port of said valving means and conveying the steam of flowing liquid from the sixth port of said valving means to said liquid chromatographic column.

n. And, the needle-collar assembly is returned to its starting position and the feeding-positioning device is advanced to position the next cylinder from (c) beneath said needle.

The method outlined in the paragraph above is discussed hereinbefore in connection with the combination which comprises the automatic sampler-injector of this invention.

Each of the elements employed in this novel method is described and its manner of operation and relation to the other elements which comprise the combination utilized in accomplishing the automatic sampling and injecting of solution into a liquid chromatographic column are detailed above. This useful method is fully illustrated in the drawings.

What is claimed is:

1. An automatic sampler-injector for use with a liquid chromatographic column comprised of, in combination:
  I. a sample container comprised of:
    a. a cylinder having a closed end and an open end; and
    b. a stopper adapted to slide snugly into the open end of said cylinder, after liquid to be sampled has been placed therein, said stopper being adapted to be pierced by a needle; and
  II. means for removing a sample from said sample container, measuring said sample, and injecting said sample into said liquid chromatographic column comprised of:
    a. a sharply pointed hollow needle spatially disposed vertically above said sample container, said needle having an annular collar affixed therearound at a sufficient distance from the point thereof to permit said point of said needle to penetrate said stopper;
    b. means for positioning said sample container beneath said needle so that said sample container and said needle are in the same vertical plane;
    c. means for contacting said stopper in said sample container with said needle, piercing said stopper with said point of said needle, contacting said stopper with said collar and moving said stopper toward the closed end of said cylinder, said movement ending when the point of said needle nears the closed end of said cylinder, and then reversing said movement until said cylinder and said needle-collar assembly are returned to their starting position;
    d. a conduit connecting said needle with the first port of a six port valving means;
    e. a discharge conduit connected to a second port of said valving means;
    f. a sampling loop connected to a third and fourth port of said valving means;
    g. means for flushing a sample from said sampling loop into said liquid chromatographic column connected to a fifth port of said valving means;
    h. a conduit to said liquid chromatographic column connected to the sixth port of said valving means;
    i. means for aligning the first port with the fourth port, the second port with the third port, and the fifth port with the sixth port of said valving means as said needle contacts said stopper, and means for aligning the first port with the second port, the third port with the sixth port, and the fourth port with the fifth port of said valving means as said cylinder and said needle-collar assembly are returned to their starting positions;
    j. means for flushing said sample from said sampling loop into said chromatographic column; and
    k. means for advancing the next sample container to a position directly beneath said needle.

2. The sampler-injector of claim 1 wherein said sample container is a glass or plastic vial with a stopper inserted snugly into the open end thereof, said stopper having at least one annular ring around the outside circumference thereof with an outside diameter slightly greater than the inside diameter of said vial.

3. The sampler-injector of claim 1 wherein said sample container is a glass or plastic vial with a stopper inserted snugly into the open end thereof, said stopper having two annular rings around the outside circumference thereof with an outside diameter slightly greater than the inside diameter of said vial.

4. The sample container of claim 2 wherein said stopper is a cylinder having one closed end and one open end and at least one annular ring around the outside circumference of said cylinder, the outside diameter of said annular ring being slightly greater than the inside diameter of the vial into which said stopper is adapted to be inserted.

5. The sample container of claim 3 wherein said stopper is a cylinder having one closed end and one open end and two annular rings around the outside circumference of said cylinder, the outside diameter of said annular rings being slightly greater than the inside diameter of the vial into which said stopper is adapted to be inserted.

6. The sampler-injector of claim 1 wherein the annular collar affixed around the circumference of said hollow needle has an outside diameter of from between about 50 and about 90 percent of the inside diameter of said cylinder of said sample container.

7. The sampler-injector of claim 1 wherein the annular collar affixed around the circumference of said hollow needle has an outside diameter of from about 75 to about 80 percent of the inside diameter of said cylinder of said sample container.

8. The sampler-injector of claim 1 wherein said means II (c) is comprised of an apparatus adapted to reciprocatingly move a member thereof down and up in a vertical plane, said member being affixed to said needle-collar assembly, said sample container remaining stationarily disposed in said vertical plane.

9. The sampler-injector of claim 1 wherein said means II (c) is comprised of an apparatus adapted to reciprocatingly move said sample container up and down in a vertical plane while said needle-collar assembly is stationarily disposed in said vertical plane.

10. The sampler-injector of claim 1 wherein said valving means is a six-port rotary core valve having a core with two oppositely positioned passageways to communicate with any of each of two adjacent ports and a passageway which communicates with any of two oppositely positioned ports in said valve.

11. The sampler-injector of claim 1 wherein said valving means is a six-port rotary core valve having a core with three independent passageways each of which can communicate with any two adjacent ports in said valve.

12. The sampler-injector of claim 1 wherein said valving means is a six-port reciprocating slidable core valve, said core having passageways therein adapted to interchangeably communicate between (ports 1) and (2,3) and (6,) and (4) and (5); and then between (1) and (4), (2) and (3), and (5) and (6).

13. The sampler-injector of claim 1 wherein said means for flushing the sample from said sampling loop into said liquid chromatographic column is comprised of a reservoir of the solvent utilized as a carrier for the constituents in the samples being analyzed, a conduit for said solvent connected from said reservoir to a pump having means attached thereto to operate said pump continuously and a conduit connected from said pump to the fifth port of said valving means.

14. A method for automatically sampling and injecting consistently uniform volumes of liquids containing components to be separated in a liquid chromatographic column into said column comprising:
  a. placing a quantity of the liquid to be sampled in a cylinder closed on one end and open on the other;
  b. inserting a snugly fitting stopper adapted to be pierced by a needle and to act as a piston into the open end of said cylinder containing said liquid;
  c. placing the thus prepared cylinder of (b) in one of a plurality of vertical cavities in a feedingpositioning device equipped with means to advance such device one cavity at a time;
  d. disposing vertically a sharply pointed hollow needle above said cylinder of (c), said needle having an annular collar affixed around the circumference thereof at a sufficient distance from the point thereof to permit said point of said needle to penetrate said stopper;
  e. connecting a conduit between said needle and the first port of a six-port valving means;
  f. connecting a conduit from the second port of said valving means to a waste receptacle;
  g. connecting a closed sampling loop having a volume equal to the volume of the sample desired to be injected into said chromatographic column to the third and fourth ports of said valving means;
  h. connecting a means for flushing a sample from said sample loop to the fifth port of said valve;
  i. connecting a conduit from the sixth port of said valving means to the inlet to said chromatographic column;
  j. aligning said valving means so that (ports 1) and (4), (2) and (3), and (5) and (6) are in communication with each other, respectively;
  k. contacting said stopper in said sample container with said needle, piercing said stopper with said point of said needle, contacting said stopper with said collar and moving said stopper toward the closed end of said cylinder utilizing said stopper as a piston forcing the liquid into and through said needle and into the first port of said valving means, out the fourth port into said sampling loop and through said sampling loop into the third port and out through the second port of said valve to said waste receptacle, stopping the downward movement of said stopper when the point of said needle nears the bottom of said cylinder;
  l. aligning the ports of said valving means so that (ports 1) and (2, 3) and (6,) and (4) and (5) communicate with each other, respectively;
  m. flushing the sample from said sampling loop with solvent flowing into the fifth port, out through the fourth port into said sampling loop and back into the third port and out through the sixth port of said valve into said chromatographic column; and
  n. returning said cylinder and said needle-collar assembly to their starting positions.

15. The method of claim 14 wherein said valving means is a rotary core valve.

16. The method of claim 14 wherein said valving means is a reciprocating slidable core valve.

17. The method of claim 14 wherein said stopper is contacted with said needle by reciprocatingly moving said needlecollar assembly down and up in the same vertical plane in which said sample container is stationarily disposed.

18. The method of claim 14 wherein said stopper is contacted with said needle by reciprocatingly moving said sample container up and down in the same vertical plane in which said needle-collar assembly is stationarily disposed.

19. The method of claim 14 wherein said feedingpositioning device utilized to position said sample container beneath said needle-collar assembly in the same vertical plane is comprised of a turntable in which there are disposed a plurality of vertical cavities, said turntable being adapted to be advanced one cavity at a time.

20. The method of claim 14 wherein said feedingpositioning device utilized to position said sample container beneath said needle-collar assembly in the same vertical plane is comprised of a linear bar in which there are disposed a plurality of vertical cavities, said bar being adapted to be advanced one cavity at a time.

* * * * *

UNITED STATES PATENT OFFICE
CERTIFICATE OF CORRECTION

Patent No. 3,918,913                    Dated November 11, 1975

Inventor(s) Charles E. Stevenson et al.

It is certified that error appears in the above-identified patent and that said Letters Patent are hereby corrected as shown below:

Column 1, line 26, "are" should read --one--.

Column 1, line 43, "same" should read --sample--.

Column 1, line 47, "ensue The" should read --ensue. The--.

Column 1, line 65, "similarity the the" should read --similarity to the--.

Column 3, line 4, "samplerinjector" should read --sampler-injector--.

Column 4, line 17, "sampler from" should read --sample from--.

Column 4, line 21, "sampler" should read --sample--.

Column 4, line 41, "saich" should read --said--.

Column 7, about lines 48 and 49, delete "forcing said stopper 12 downwardly within cylinder 11 so that".

UNITED STATES PATENT OFFICE
CERTIFICATE OF CORRECTION

Patent No. 3,918,913  Dated November 11, 1975

Inventor(s) Charles E. Stevenson et al.

It is certified that error appears in the above-identified patent and that said Letters Patent are hereby corrected as shown below:

Column 8, line 11, "Sequentlly" should read --Sequentially--.

Column 8, line 30, "said port" should read --said first port--.

Column 8, line 51, "firth" should read --fifth--.

Column 12, line 5, "position" should read --positions--.

Column 13, lines 26, 27 and 28, delete all parentheses.

Column 14, lines 9 and 10, delete all parentheses.

Column 14, line 26, delete all parentheses.

Signed and Sealed this nineteenth Day of July 1977

[SEAL]

Attest:

RUTH C. MASON
Attesting Officer

C. MARSHALL DANN
Commissioner of Patents and Trademarks